United States Patent [19]

McIntire

[11] 4,432,345

[45] Feb. 21, 1984

[54] RECEIVER FOR SOLAR ENERGY COLLECTOR HAVING IMPROVED APERTURE ASPECT

[75] Inventor: William R. McIntire, Downers Grove, Ill.

[73] Assignee: The United States of America as represented by the United States Department of Energy, Washington, D.C.

[21] Appl. No.: 243,308

[22] Filed: Mar. 13, 1981

[51] Int. Cl.³ ............................................. F24J 3/02
[52] U.S. Cl. .................................. 126/439; 126/440; 126/443
[58] Field of Search ............... 126/438, 439, 440, 441, 126/443; 350/288, 293, 299

[56] References Cited

U.S. PATENT DOCUMENTS

| | | | |
|---|---|---|---|
| 4,131,485 | 12/1978 | Meinel et al. ................... | 126/439 X |
| 4,230,095 | 10/1980 | Winston ............................. | 126/439 |
| 4,238,246 | 12/1980 | Genequand et al. ........... | 126/440 X |
| 4,249,516 | 2/1981 | Stark ................................... | 126/439 |
| 4,287,880 | 9/1981 | Geppert ............................. | 126/439 |
| 4,290,418 | 9/1981 | Uroshevich ....................... | 126/439 |
| 4,300,538 | 11/1981 | Uroshevich ..................... | 126/439 X |
| 4,340,034 | 7/1982 | Hopper ............................. | 126/439 X |

FOREIGN PATENT DOCUMENTS 1165672 10/1958 France ............................... 126/439

*Primary Examiner*—Samuel Scott
*Assistant Examiner*—Margaret A. Focarino
*Attorney, Agent, or Firm*—Bruce R. Mansfield; Paul A. Gottlieb

[57] ABSTRACT

A secondary concentrator for use in receiver systems for linear focusing primary concentrators is provided with reflector wings at each end. The wings increase the capture of light rays reflected from areas adjacent the rim of a primary concentrator, increasing the apparent aperture size of the absorber as viewed from the rim of the primary concentrator. The length, tilt, and curvature of the wing reflectors can be adjusted to provide an absorber having a desired aperture aspect.

10 Claims, 4 Drawing Figures

RECEIVER FOR SOLAR ENERGY COLLECTOR HAVING IMPROVED APERTURE ASPECT

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

This invention pertains to imaging type solar energy collectors having receivers which include secondary concentrator elements. Solar energy collectors of this type are generally comprised of a receiver which intercepts solar energy coming from a adjacent reflector surface, Fresnel lens, or the like primary concentrator. To minimize thermal losses, the absorber portion of the receiver should be as small as possible, consistent with the flow of fluid coolant therethrough. However, due to the finite angular width of the sun, imperfections in the concentrator surface, alignment errors, and tracking tolerances, the receiver can not be made arbitrarliy small, but must be made large enough to intercept the sunlight reflected from any given point on the primary concentrator. The path length of reflected light measured from points on the primary concentrator to the receiver are generally a maximum at the rim of the primary concentrator, decreasing to a minimum at the center of the primary concentrator. To accommodate the resultant spread in beam size for given angular tolerances, the absorber aperture size should be larger when viewed from the concentrator rim, than when viewed from its center.

Linear focusing receivers can comprise a secondary concentrator and an energy absorber upon which solar energy is reflected from a primary concentrator. For thermal loss considerations, a receiver for a linear focusing system must have a convection suppressing cover tube with a gap large enough to reduce the attendant air conduction losses. If an evacuated receiver tube is required, there still must be a sizeable gap between the solar energy absorber elements and the cover tube, to accommodate manufacturing tolerances and bow in the absorber tube. Accordingly, such receiver designs should provied a sizeable gap between the secondary concentrator and an absorber so as to accommodate a conduction suppressing cover tube for the receiver absorber, without allowing a loss of radiation through the gap.

SUMMARY OF THE INVENTION

It is therefore an object of the present invention to provide improved collection efficiencies for solar energy receivers used in conjuction with a primary concentrator to form an imaging-type solar energy collector. More specifically, it is an object of this invention to provide a solar energy absorber having an apparent aperture which varies in size, from a maximum near the rim of the primary concentrator, to a minimum near the center of the primary concentrator.

It is another object of the present invention to provide an improved receiver of the type described above, which will accommodate, in a gap between the secondary concentrator and an energy absorber component, a convection suppressing cover tube surrounding the energy absorber, without allowing a loss of radiation energy in the gap.

It is a further object of the present invention to provide an improved receiver of the type described above wherein the secondary concentrator is disposed between the energy absorber and a convection-suppressing cover tube surrounding the energy absorber.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

These and other objects are provided by an improved solar energy receiver which is used in conjuction with an imaging-type primary concentrator, such as a reflector element or Fresnal lens, to form a solar energy collector. The receiver comprises a secondary concentrator and an energy absorber component. When viewed from points along the primary concentrator, the absorber presents an aperture whose size varies, depending upon the location of the viewing point on the primary concentrator. According to the invention, reflector wing elements are positioned adjacent a secondary concentrator of known contour, such that the apparent aperture of the absorber is increased, particularly when viewed from points adjacent the rim of the primary concentrator. The wing reflector elements are anisomorphically formed with the secondary concentrator so as not to lie along an extension of the contour of the secondary concentrator.

In one form, the invention comprises a receiver for a linear focusing concentrator, the receiver including an energy absorber component and a secondary concentrator, spaced apart so as to form an intervening gap which accommodates a convection suppressing cover tube.

In an alternative form, the invention differs from the foregoing in that the secondary concentrator is disposed within the convection suppressing cover tube, with the reflector wing elements lying wholly or partially within or without the cover tube. The invention may be employed with point focusing as well as linear focusing receiver types.

DESCRIPTION OF THE PREFERRED EMBODIMENT

Figure 1:
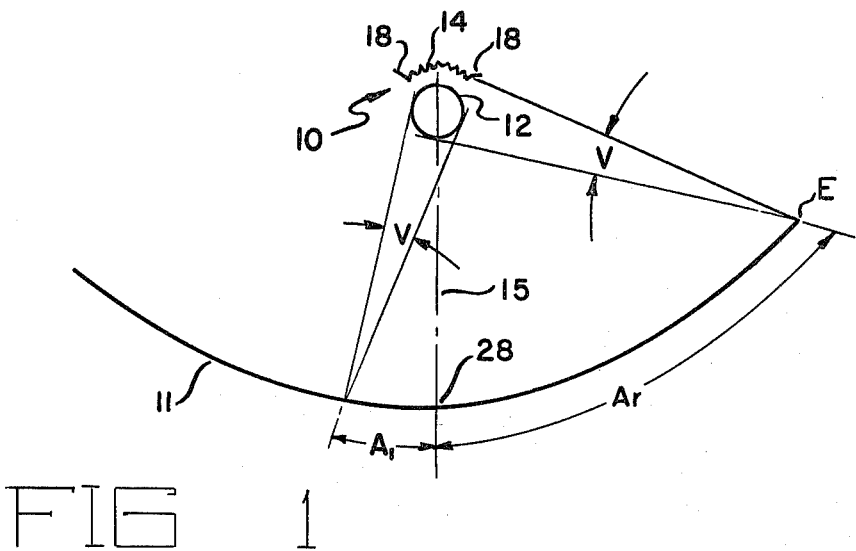
FIG. 1 shows a solar energy collector according to the invention.

Referring now to the drawings, and in particular to FIG. 1, a solar energy collector is shown comprising a receiver 10 and a primary concentrator 11. Receiver 10 includes an energy absorber 12, and a secondary concentrator element 14 which receives solar energy from the primary concentrator 11, directing that energy to energy absorber 12. Primary concentrator 11 is preferably of the reflector, or mirror surface type, but could also be of a Fresnel lens type in which radiant energy is passed through, rather than reflected. Elements 11 which concentrates solar energy, has surfaces which suffer from irregularities in shape, creating angular variations in the solar energy concentrated. In addition to irregularities in concentrating surfaces, angular variations in the concentrated solar energy result from the finite angular width of the sun, tracking tolerances, and alignment errors. Such angular variations create severe limitations on collection efficiencies. For the purposes of illustration, a total angular variation V is shown at various viewing angles A, measured with respect to the centerline, or axis 15 of primary concentrator 11. At a viewing angle $A_1$, variation V, when projected onto absorber 12, covers the entire absorber surface available at angle $A_1$. The same angular variation V, when located at the rim edge E of primary concentrator 11 (viewing angle $A_r$) causes the reflected radiation within that angular variation to not only cover the entire surface area of absorber 12 available at angle $A_r$, but also to spill over, bypassing the absorber. With prior art arrangements, a portion of such spillage bypasses secondary concentrator 14, and hence would not be directed to absorber 12.

Figure 2:
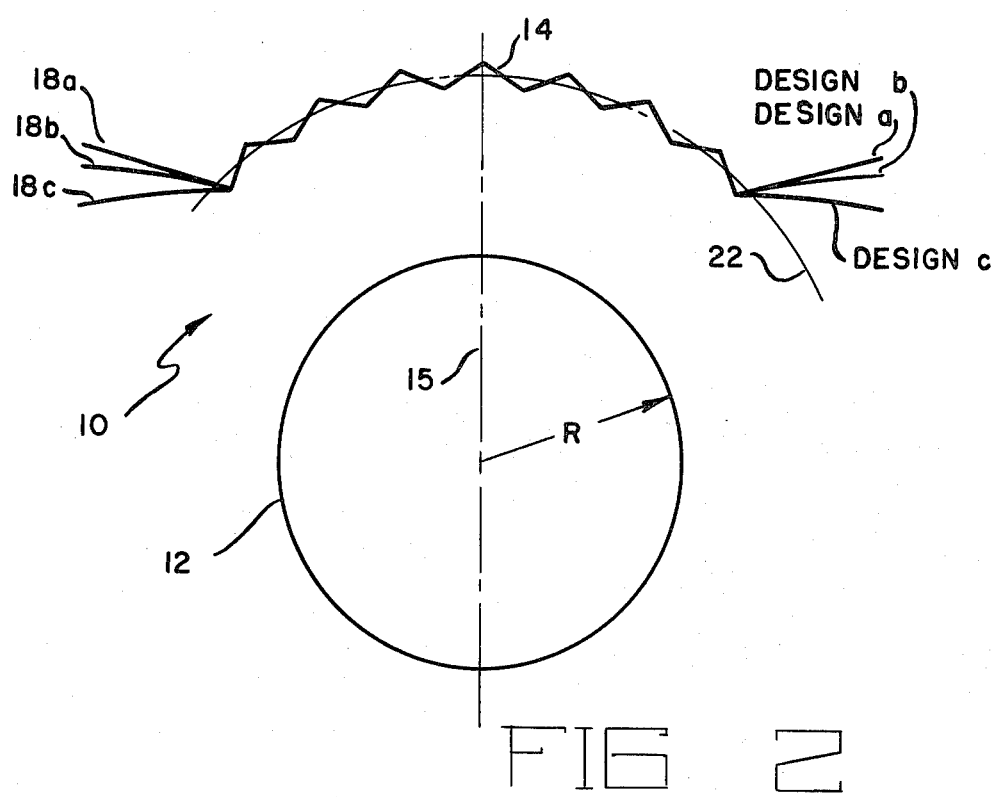
FIG. 2 shows the receiver of FIG. 1 in greater detail.

According to the invention, reflector wings 18 are added to secondary concentrator 14 so as to increase the apparent aperture of absorber 12 as seen from points on primary concentrator 11 adjacent rim or edge E, i.e. points whose viewing angle approaches angle $A_r$ of FIG. 1. For an example of the embodiment of FIG. 1, reference is made to FIG. 2, which shows the receiver 10 of FIG. 1 in greater detail. Reflector wings 18a are added to the ends of secondary concentrator 14. Secondary concentrator 14 may include any of the non-imaging designs heretofore developed. To overcome the substantial gap losses of non-imaging optics designs, the preferred embodiment shown in FIGS. 1 and 2 includes a secondary concentrator element incorporating the multiple-faceted, construction. Secondary concentrator 14 of the perferred embodiment has a generally cylindrical contour, corresponding to the cylindrical form of absorber 12. FIG. 2 shows a cross-sectional view of secondary concentrator 14, wherein line 22 indicates an extension of the contour of secondary concentrator 14. In the preferred embodiment of FIGS. 1 and 2, reflector wings 18a are positioned adjacent secondary concentrator 14. Wings 18a are of straight line configuration, and are outwardly bent with respect to extended contour line 22.

Reflector wings 18b, 18c, also shown in FIG. 2 are alternative embodiments of the invention, and are concave when viewed from primary concentrator 11. Each reflector wing according to the invention is characterized by departing from the shape or contour of the secondary concentrator element with which it is formed, i.e. the wing reflectors are anisomorphically formed with respect to the contour of the secondary concentrator element, and operate to increase the apparent aperture of the absorber at viewing angles of the primary concentrator lying outside central portions of the concentrator (where the viewing angle approaches 0°). Phantom lines 22 show an extension of secondary concentrator element 14 beyond its actual construction, to indicate that reflector wings 18a–c depart from the shape or contour of element 14.

Figure 3:
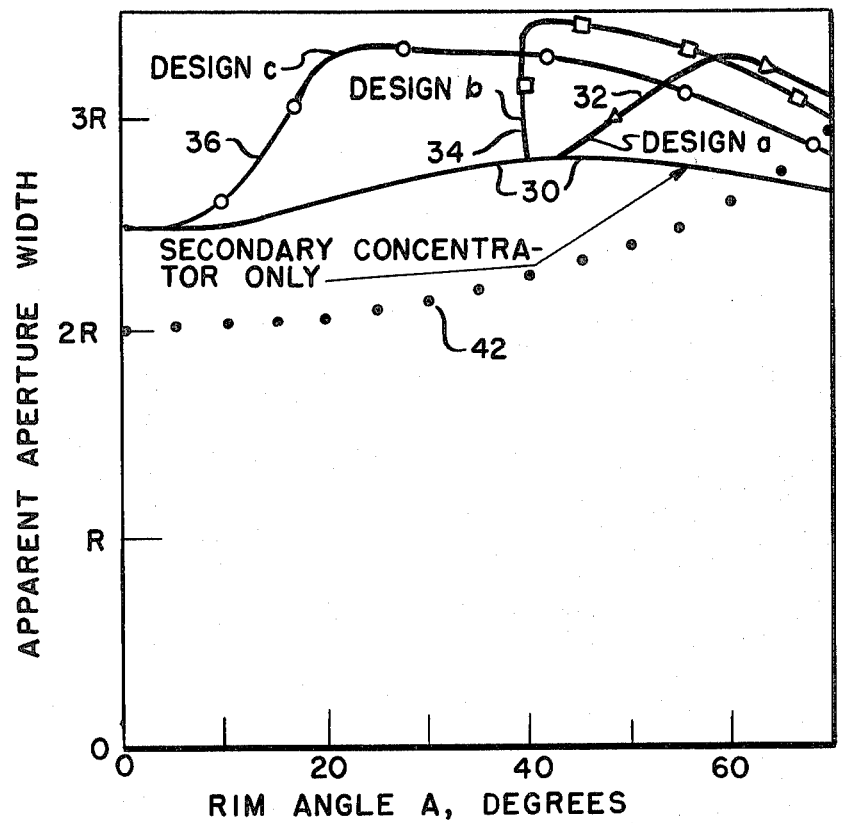
FIG. 3 is a graph describing the operation of the receiver of FIGS. 1 and 2.

Operation of the three reflector wings 18a, 18b and 18c, (denominated designs a, b, and c, respectively) is shown in the graph of FIG. 3, which plots the apparent aperture width of absorber 12 against viewing angles as viewed from primary concentrator 11. In the preferred embodiment of FIG. 2, primary concentrator 11 is a 70° rim angle parabolic trough, having a maximum rim angle of 70°, as measured from center line or axis 15. Curve 30 shows the performance of secondary concentrator 14 alone, without reflector wings, indicating a modest increase in apparent aperture, particularly for rim angles adjacent 45°. The "apparent" aperture for absorber 12 alone would be 2 R for all values of rim angle. Reflector wings 18a, 18b, and 18c when added to secondary concentrator 14 according to the invention, increase the apparent aperture of absorber 12 at varying rates, and over varying ranges of primary concentrator rim angle.

FIG. 3 shows various apparent aperture sizes of absorber 12 (as seen from primary concentrator 11), as a function of viewing angle A for each of the wing reflector designs 18a, 18b and 18c. A comparison of the curves 30, 32 for the faceted secondary concentrator element 14 alone, and for the element 14 plus the straight wing reflectors 18a (denominated "design a"), respectively, shows how the wings 18a widen the apparent aperture of absorber 12 for rim angles of A greater than 40°, to therefor provide a substantial increase in apparent aperture seen from near the rim of the primary concentrator 11. As rim angle A is increased beyond 40°, larger portions of wing reflectors 18a contribute to the effective aperture of absorber 12. At a viewing angle A equal to approximately 60°, the entire wing reflector 18a contributes to the apparent aperture of absorber 12.

Curve 42 shows the required increase in aperture size with increasing viewing angle A for a parabolic trough. If the angular tolerances require a receiver of aperture 2 R as seen from the center of the parabolic trough (e.g. point 28 of FIG. 1), the same angular tolerances would require an aperture nearly 3R when viewed from the 70° rim angle, due to the increased path length from a primary concentrator to the receiver 10. The simple, straight wing reflectors 18a of FIG. 1 provide an aperture which remains larger than the required aperture size, without increasing the absorber tube size and thereby increasing attendant thermal losses.

The alternative design of wing reflector 18b of FIG. 1 is concave and outwardly bent such that the entire wing begins to contribute to the capture of light rays reflected from areas adjacent the rim of a primary concentrator, at viewing angles 40° and larger. With reference to curve 34 of FIG. 3, it can be seen that this design provides a wider aperture than the straight reflector design of wings 18a, for viewing angles greater than or equal to 40°, but approximately less than or equal to 58°. This wing design however has a slightly narrower aperture near a viewing angle of 70°.

Wing reflector design 18c is another concave reflector which provides the largest apertures at smaller values of viewing angle, and sacrifices aperture size at larger values nearer the rim or edge E of primary concentrator 11. This design, as indicated by curve 36 of FIG. 3, emphasizes the large areas of a primary concentrator at smaller viewing angles, rather than the relatively smaller areas at larger angles.

The graph of FIG. 3, showing varying apertures as a function of viewing angle, illustrates the range of possibilities for secondary concentrators constructed according to the invention. By adjusting the length, tilt, and curvature of the wing reflectors, the relationship of the aperture size to viewing angle can be adjusted so as to provide absorbers having the desired aperture aspect for a variety of primary concentrators. The secondary concentrators can be used to accommodate absorber tubes of decreased sizes, and hence decreased thermal losses, or they can be used to increase the primary concentrator's manufacturing and tracking tolerances, for a given size of absorber tube. The increased tolerances should have a strong impact on the costs and reliability of linear focusing systems.

Figure 4:
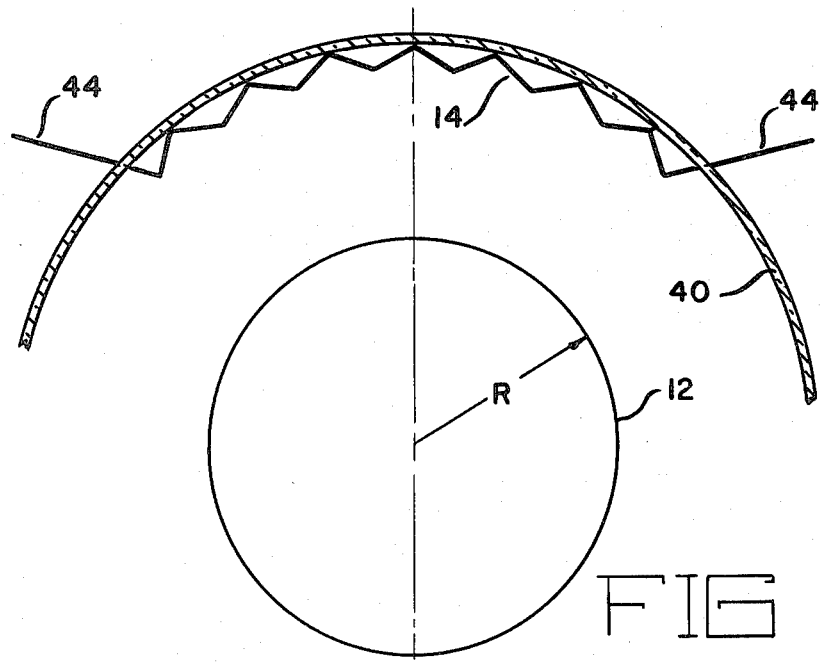
FIG. 4 shows an alternative embodiment of the receiver of FIGS. 1 and 2.

Reflector wings according to the invention need not be integrally formed with the secondary concentrator to which they are matched. The preferred embodiments of FIGS. 1 and 2 show reflector wings integrally formed with secondary concentrator 14 to allow for economy of one-piece fabrication. However, other embodiments of the invention are contemplated in which a cover for suppressing conduction losses of absorber 12 surrounds not only absorber 12, but also secondary concentrator 14. Such an arrangement is shown in FIG. 4 wherein a glass cover tube 40 encloses secondary concentrator 14 as well as absorber 12. In this embodiment, reflector wings 44 are not integrally formed with secondary concentrator 14, due to the intervening cover tube 40. In this embodiment, secondary concentrator 14 could comprise a metallized glass surface, integrally formed with glass cover tube 40. Reflector wings 44 could also comprise metallized glass surfaces integrally formed with cover tube 40.

Thus it can be seen that reflector wings according to the invention selectively increase the apparent aperture of a solar energy abosrber, thereby increasing its collection efficiency. As will be appreciated by those skilled in the art, the receiver of this invention can be combined with a variety of primary concentrator designs, to produce improved solar energy collector systems.

The embodiments of this invention in which an exclusive property or privilege is claimed are defined as follows:

1. In a solar energy collector having a primary concentrator which includes a rim portion and a center portion, said primary concentrator directing solar energy toward a solar energy receiver which comprises an absorber means having an apparent aperture when viewed from the primary concentrator, said solar energy receiver further comprising:
   a secondary concentrator located adjacent said absorber means for reflecting solar energy directed from the primary concentrator onto said absorber means, said secondary concentrator including a reflector surface having a predetermined contour and at least one edge portion; and
   a reflector wing located adjacent said edge portion of the contour of the reflector surface and outwardly bent therefrom so as to lie at an angle to the extended contour of said reflector surface of said second concentrator, to increase the apparent aperture of said absorber means when viewed from said rim portion of said primary concentrator.

2. The arrangement of claim 1 wherein said reflector wing comprises an outwardly bent portion of said secondary concentrator.

3. The arrangement of claim 1 wherein said secondary concentrator is of a design having multiple faceted sections.

4. The arrangement of claim 3 wherein said reflector wing has a generally straight-line cross-sectional configuration.

5. The arrangement of claim 4 wherein said primary and said secondary concentrators focus a substantially linear image on said absorber means.

6. The arrangement of claim 5 wherein said absorber means is enclosed within a conduction suppressing cover tube.

7. The arrangement of claim 6 wherein said secondary concentrator is also enclosed within said cover tube.

8. The arrangement of claim 7 wherein said secondary concentrator comprises at least one metallized glass surface integrally formed with said cover tube.

9. The arrangement of claim 5 wherein the primary concentrator has a generally parabolic cross-sectional configuration.

10. The arrangement of claim 1 wherein said primary concentrator comprises a Fresnel lens.

* * * * *